(12) United States Patent
Rahman et al.

(10) Patent No.: US 11,007,971 B2
(45) Date of Patent: May 18, 2021

(54) SIDE AIRBAG INCLUDING SPACER CHAMBER

(71) Applicant: Ford Global Technologies, LLC, Dearborn, MI (US)

(72) Inventors: Tahmidur Rahman, Canton, MI (US); Zhibing Deng, Northville, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 97 days.

(21) Appl. No.: 16/277,185

(22) Filed: Feb. 15, 2019

(65) Prior Publication Data
US 2020/0262383 A1 Aug. 20, 2020

(51) Int. Cl.
| | |
|---|---|
| *B60R 21/261* | (2011.01) |
| *B60R 21/231* | (2011.01) |
| *B60R 21/207* | (2006.01) |
| *B60R 21/00* | (2006.01) |

(52) U.S. Cl.
CPC .......... *B60R 21/261* (2013.01); *B60R 21/207* (2013.01); *B60R 21/23138* (2013.01); *B60R 2021/0006* (2013.01); *B60R 2021/23107* (2013.01); *B60R 2021/2615* (2013.01)

(58) Field of Classification Search
CPC ............ B60R 21/261; B60R 21/23138; B60R 21/207; B60R 2021/23107; B60R 2021/2615; B60R 2021/0006
USPC ........................................................ 280/740
See application file for complete search history.

(56) References Cited

U.S. PATENT DOCUMENTS

| | | | | |
|---|---|---|---|---|
| 5,623,246 A | * | 4/1997 | Kruse | B60R 21/0132 180/274 |
| 5,803,485 A | * | 9/1998 | Acker | B60R 21/207 280/728.2 |
| 6,113,135 A | * | 9/2000 | Tsutsumi | B60R 21/207 280/730.2 |
| 7,021,652 B2 | * | 4/2006 | Kumagai | B60R 21/233 280/729 |
| 7,063,350 B2 | * | 6/2006 | Steimke | B60R 21/23138 280/729 |
| 7,316,415 B2 | * | 1/2008 | Jamison | B60R 21/233 280/729 |
| 7,347,444 B2 | * | 3/2008 | Wheelwright | B60R 21/23138 280/729 |
| 7,775,552 B2 | | 8/2010 | Breuninger et al. | |
| 7,900,957 B2 | * | 3/2011 | Honda | B60R 21/2346 280/729 |
| 8,596,678 B2 | | 12/2013 | Ravenberg et al. | |
| 9,108,587 B2 | * | 8/2015 | Rickenbach | B60R 21/233 |

(Continued)

FOREIGN PATENT DOCUMENTS

| | | | | |
|---|---|---|---|---|
| DE | 19850448 A1 | * | 5/2000 | .......... B60R 21/261 |
| DE | 102005062849 A1 | | 9/2007 | |

(Continued)

*Primary Examiner* — Paul N Dickson
*Assistant Examiner* — Kurtis Nielson
(74) *Attorney, Agent, or Firm* — Frank A. MacKenzie; Bejin Bieneman PLC

(57) ABSTRACT

An assembly includes a seatback having an upright frame member and a side airbag mounted to the upright frame member. The side airbag is inflatable to an inflated position. The side airbag includes a forward chamber and a spacer chamber adjacent each other and substantially fluidly separated from each other in the inflated position. At least one inflator is in fluid communication with the forward chamber and the spacer chamber.

16 Claims, 6 Drawing Sheets

(56) References Cited

U.S. PATENT DOCUMENTS

| | | | |
|---|---|---|---|
| 9,266,495 B2 | 2/2016 | Grindle et al. | |
| 9,707,922 B2 | 7/2017 | Wiik | |
| 2005/0189742 A1* | 9/2005 | Kumagai | B60R 21/23138 280/730.2 |
| 2006/0103120 A1* | 5/2006 | Kurimoto | B60R 21/233 280/730.2 |
| 2009/0212539 A1* | 8/2009 | Honda | B60R 21/261 280/729 |
| 2010/0295277 A1* | 11/2010 | Ochiai | B60R 21/23138 280/729 |
| 2012/0043741 A1* | 2/2012 | Yamamoto | B60R 21/233 280/730.2 |
| 2012/0217731 A1* | 8/2012 | Baba | B60R 21/233 280/730.2 |
| 2014/0151984 A1* | 6/2014 | Fukawatase | B60R 21/23138 280/730.2 |
| 2016/0101759 A1* | 4/2016 | Fujiwara | B60R 21/23138 280/730.2 |
| 2016/0264091 A1* | 9/2016 | Fujiwara | B60R 21/233 |
| 2017/0174174 A1* | 6/2017 | Ohno | B60R 21/235 |
| 2017/0225640 A1* | 8/2017 | Ohno | B60R 21/239 |
| 2017/0267206 A1* | 9/2017 | Hanks | B60R 21/23138 |
| 2018/0086302 A1* | 3/2018 | Hiraiwa | B60R 21/207 |
| 2018/0281741 A1* | 10/2018 | Nagasawa | B60R 21/2338 |
| 2019/0084516 A1* | 3/2019 | Fukawatase | B60R 21/207 |
| 2019/0161050 A1* | 5/2019 | Schneider | B60R 21/2338 |

FOREIGN PATENT DOCUMENTS

| | | | |
|---|---|---|---|
| EP | 1008494 A2 * | 6/2000 | B60R 21/23138 |
| EP | 2626253 B1 | 5/2016 | |
| JP | 09188215 A * | 7/1997 | B60N 2/4235 |
| JP | 2011140246 A | 7/2011 | |
| JP | 2014031096 A | 2/2014 | |

* cited by examiner

SIDE AIRBAG INCLUDING SPACER CHAMBER

BACKGROUND

A side airbag is mounted to a seatback and is inflatable along a side of an occupant, specifically along the torso and/or hip of the occupant. The side airbag, for example, may be inflatable between the occupant and a vehicle door. The side airbag controls the kinematics of the occupant in vehicle impacts that urge the occupant in a cross-vehicle direction, e.g., a side impact.

DETAILED DESCRIPTION

Figure 1:
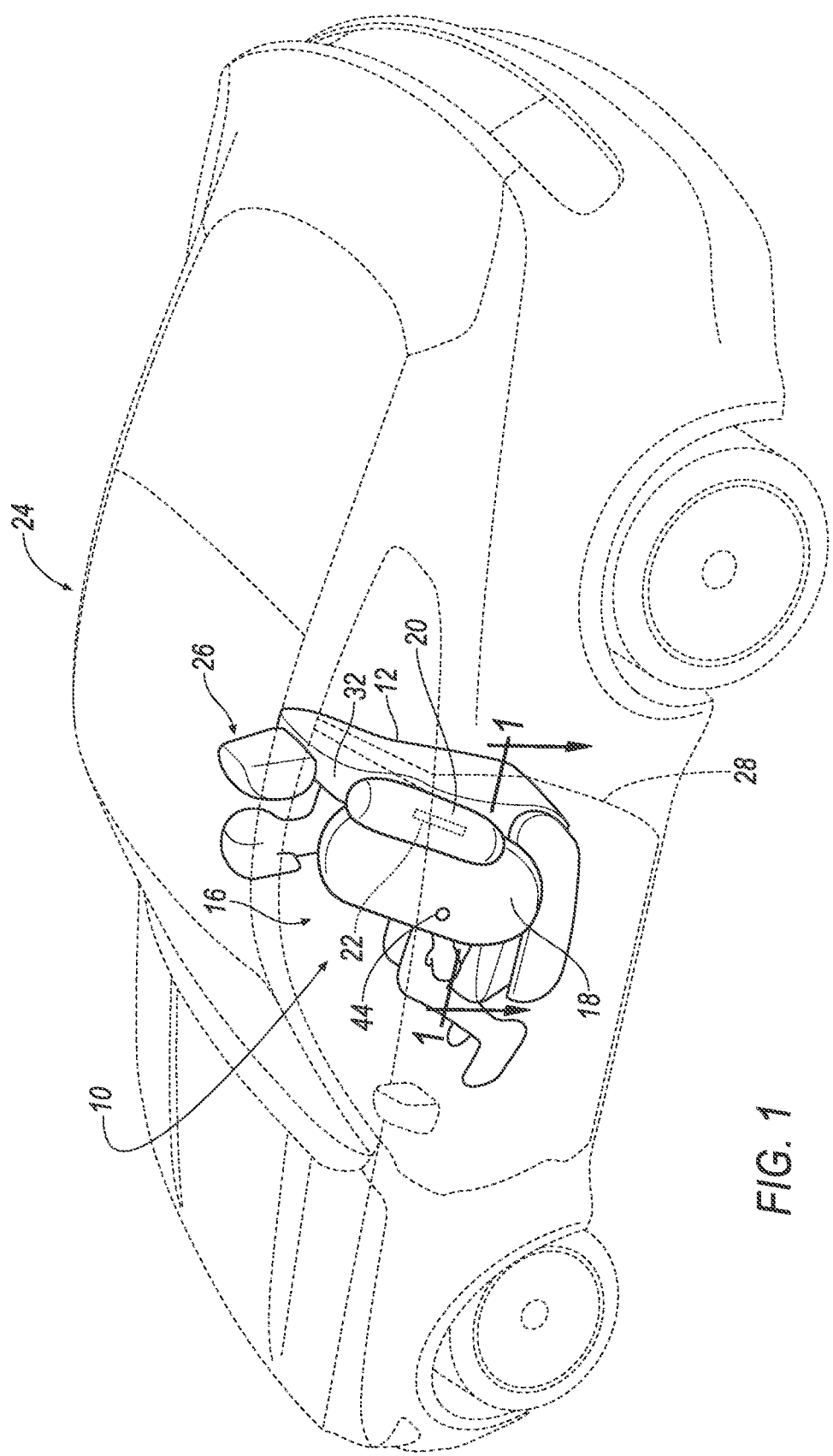
FIG. 1 is a perspective view of a vehicle with a side airbag having a forward chamber and a spacer chamber in an inflated position.

An assembly includes a seatback having an upright frame member and a side airbag mounted to the upright frame member and inflatable to an inflated position. The side airbag includes a forward chamber and a spacer chamber adjacent each other and substantially fluidly separated from each other in the inflated position. At least one inflator is in fluid communication with the forward chamber and the spacer chamber.

At least one of the inflator and/or the forward chamber and spacer chamber may be designed to inflate the spacer chamber to a higher pressure than the forward chamber in the inflated positions.

The spacer chamber may be elongated along the upright frame member.

The assembly may include a door, and the spacer chamber may be positioned to be between the seatback and the door in the inflated position.

The forward chamber may extend in a vehicle-forward direction from the spacer chamber in the inflated position.

A portion of the forward chamber may extend between the spacer chamber and the seatback in the inflated position.

The spacer chamber may be at a higher pressure than the forward chamber in the inflated position.

The at least one inflator may be is a single inflator in fluid communication with both the forward chamber and the spacer chamber. The inflator includes a diffuser in communication with both the forward chamber and the spacer chamber. The diffuser may include a fluid pathway to both the forward chamber and the spacer chamber, the fluid pathway to the spacer chamber being a different size than the fluid pathway to the forward chamber. The inflator may include a first gas outlet in communication with the forward chamber and a second gas outlet in communication with the spacer chamber. The at least one inflator includes a first inflator in communication with the forward chamber and a second inflator in communication with the spacer chamber. The at least one inflator is mounted to the seatback.

With reference to the Figures, wherein like numerals indicate like parts throughout the several views, an assembly 10 of a vehicle 24 includes a seatback 12 having an upright frame member 14. A side airbag 16 is mounted to the upright frame member 14 and is inflatable to an inflated position. The side airbag 16 includes a forward chamber 18 and a spacer chamber 20 adjacent each other and substantially fluidly separated from each other in the inflated position. At least one inflator 22 is in fluid communication with the forward chamber 18 and the spacer chamber 20.

Since the spacer chamber 20 and the forward chamber 18 are substantially fluidly separated from each other, the spacer chamber 20 and the forward chamber 18 may be inflated to different inflation pressures, which allows the spacer chamber 20 to inflate to a pressure to resist door intrusion and allows the forward chamber 18 to inflate to a pressure to control occupant kinematics. As an example, the spacer chamber 20 may be inflated to a greater pressure than the forward chamber 18 to resist door intrusion, as described further below.

The vehicle 24 may be any passenger or commercial automobile such as a car, a truck, a sport utility vehicle, a crossover vehicle, a van, a minivan, a taxi, a bus, etc. The vehicle 24 includes at least one seat 26. The seat 26 may be of any suitable type, e.g., a bucket seat, bench seat, etc. The seat 26 may be at any suitable location, e.g., a front seat, rear seat, driver seat, passenger seat, etc.

The side airbag 16 is deployable between the occupant and a door 28 of the vehicle 24. In the example shown in FIG. 1, the seat 26 is a front seat and the door 28 is a front door. Alternatively, the seat 26 and door 28 may be in any other suitable location, e.g., a rear seat and rear door. The seat 26 shown in FIG. 1 is a driver seat 26 and, alternatively, the seat 26 may be a passenger seat. In any event, the side airbag 16 is deployable in the space between the seat 26 and the adjacent door 28.

The seat 26 includes the seatback 12 and a seat bottom (not numbered). The seatback 12 may be supported by the seat bottom and may be stationary or movable relative to the seat bottom. The seatback 12 and the seat bottom may be adjustable in multiple degrees of freedom. Specifically, the seatback 12 and the seat bottom may themselves be adjustable, in other words, adjustable components within the seatback 12 and/or the seat bottom, and/or may be adjustable relative to each other.

The seatback 12 may include a seatback frame 30 and a covering 32 supported on the seatback frame 30. The seatback frame 30 may include tubes, beams, etc. Specifically, the seatback frame 30 includes a pair of upright frame members 14 (one of which is identified in FIGS. 5 and 6). The upright frame members 14 are elongated, and specifically, are elongated in a generally upright direction when the seatback 12 is in a generally upright position. The upright frame members 14 are spaced from each other and the seatback frame 30 includes cross-members (not shown) extending between the upright frame member 14s. The seatback frame 30, including the upright frame members 14, may be of any suitable plastic material, e.g., carbon fiber reinforced plastic (CFRP), glass fiber-reinforced semi-finished thermoplastic composite (organosheet), etc. As another example, some or all components of the seatback frame 30 may be formed of a suitable metal, e.g., steel, aluminum, etc.

The covering 32 may include upholstery and padding. The upholstery may be cloth, leather, faux leather, or any other suitable material. The upholstery may be stitched in panels around the frame. The padding may be between the covering and the seatback frame 30 and may be foam or any other suitable material.

The seatback 12 may define an occupant seating area. The occupant may be disposed in the occupant seating area, as shown in the Figures. The occupant seating area may be on a front side of the seatback 12. As described below, the side airbag 16, specifically the forward chamber 18, may extend from the seatback 12 next to the occupant seating area to control occupant kinematics.

At least one inflator 22 is in fluid communication with the forward chamber 18 and the spacer chamber 20. Upon receiving a signal from, e.g., a computer, the inflator 22 may simultaneously inflate the forward chamber 18 and the spacer chamber 20 with an inflatable medium, such as a gas. The inflator 22 may be, for example, a pyrotechnic inflator 22 that uses a chemical reaction to drive inflation medium to the forward chamber 18 and the spacer chamber 20. The inflator 22 may be of any suitable type, for example, a cold-gas inflator. The inflator 22 may be fixed to the seatback frame 30, e.g., to one of the upright frame members 14.

Figure 2:
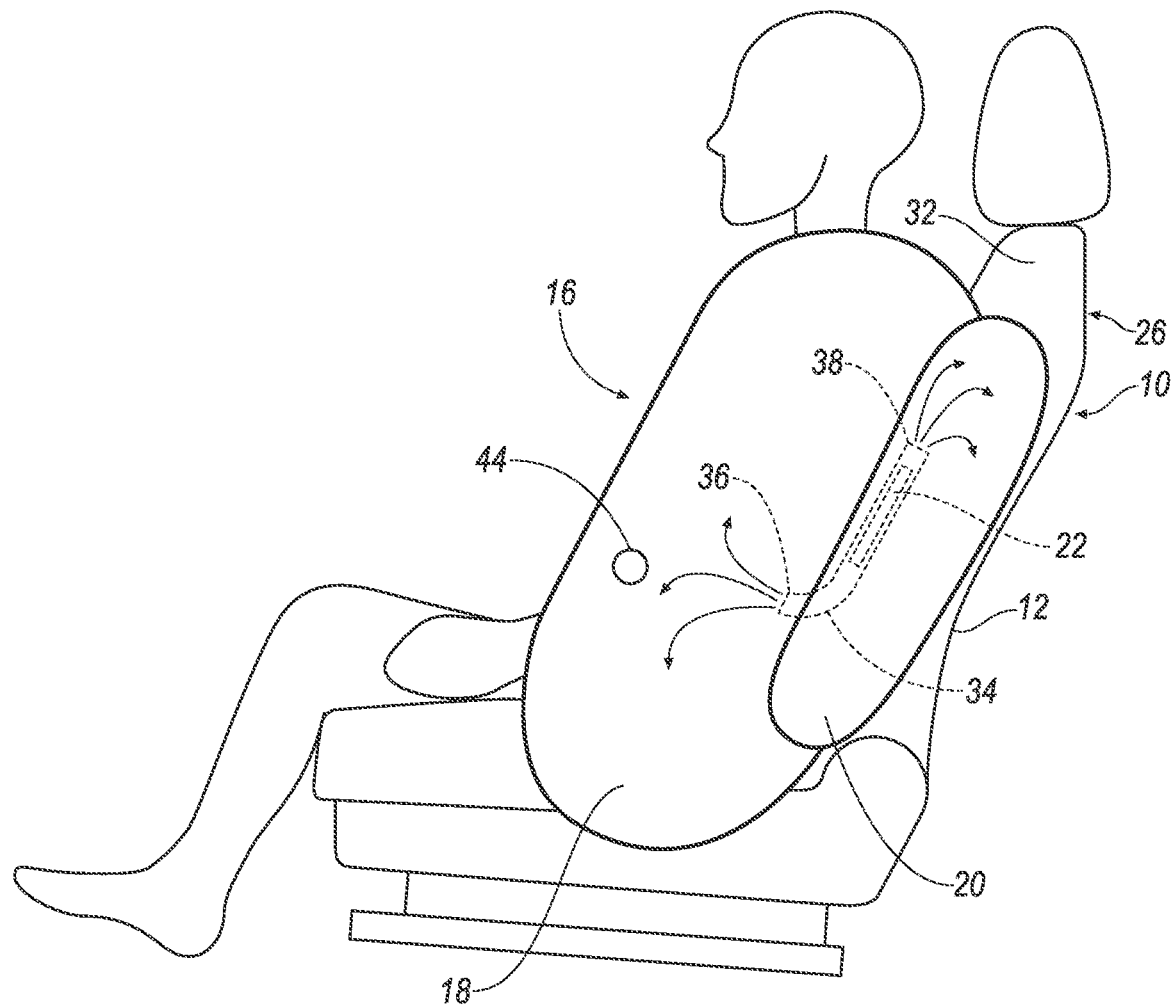
FIG. 2 is a side view of a seat and one example of the side airbag.

In the example shown in FIG. 2, the inflator 22 includes a diffuser 34 that delivers inflation medium to the chambers 18, 20. Specifically, the diffuser 34 is in fluid communication with both the forward chamber 18 and the spacer chamber 20. The diffuser 34 includes a fluid pathway to both the forward chamber 18 and the spacer chamber 20. Specifically, the diffuser 34 includes a first outlet 36 in communication with the forward chamber 18 and a second outlet 38 in communication with the spacer chamber 20. As described below, the first outlet 36 and the second outlet 38 may be sized to inflate the forward chamber 18 and the spacer chamber 20, respectively, to the desired inflation pressures. The first outlet 36 and the second outlet 38 may each include one or more holes for communicating inflation medium to the forward chamber 18 and the spacer chamber 20, respectively. The diffuser 34, for example, may be of the same type of material as the forward chamber 18 and the spacer chamber 20.

Figure 3:
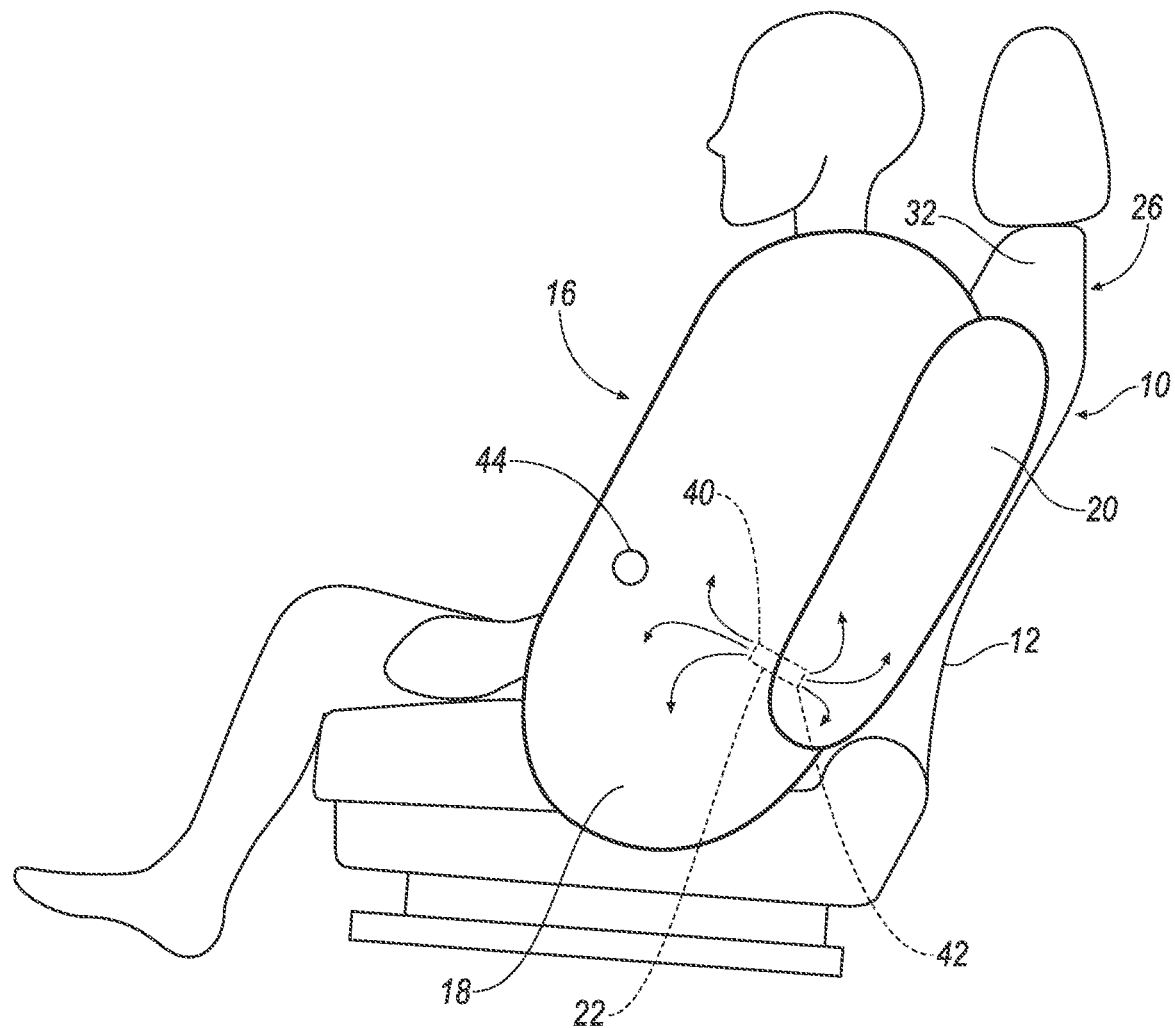
FIG. 3 is a side view of the seat and another example of the side airbag.

In the example shown in FIG. 3, a body of the inflator 22 includes two separate outlets in communication with the forward chamber 18 and the spacer chamber 20, respectively. In other words, the body of the inflator 22 discharges inflation medium at two locations. Specifically, the inflator 22 includes a first outlet 40 in communication with the forward chamber 18 and a second outlet 42 in communication with the spacer chamber 20. As described below, the first outlet 40 and the second outlet 42 and/or respective gas inflation sources for the first outlet 40 and the second outlet 42 are sized to inflate the forward chamber 18 and the spacer chamber 20, respectively, to the desired inflation pressures.

In some examples, the assembly 10 includes a single inflator 22 in fluid communication with both the forward chamber 18 and the spacer chamber 20. In the alternative to the examples shown in FIGS. 2 and 3, inflator(s) 22 may separately inflate the forward chamber 18 and the spacer chamber 20 in any suitable fashion. For example, with reference to FIG. 4, the assembly 10 may include one inflator 22 in communication with the forward chamber 18 and another inflator 22 in communication with the spacer chamber 20. As another example, a single inflator 22 may be in separate communication with the forward chamber 18 and the spacer chamber 20 with fill tubes. In any instance, the inflator 22 (or inflators 22) may be mounted to the seatback 12, e.g., to the seatback frame 30 such as the upright frame member 14, and/or cross-member, etc.

The side airbag 16 may be mounted to the upright frame member 14. Specifically, the forward chamber 18 and/or the spacer chamber 20 may be mounted to the upright frame member 14. The forward chamber 18 and the spacer chamber 20 may be mounted to the upright frame member 14 by a common mounting feature. The side airbag 16, i.e., the forward chamber 18 and/or the spacer chamber 20, may be directly mounted to the upright frame member 14 or may be indirectly mounted to the upright frame member 14. The side airbag 16 may be, for example, mounted to the upright frame member 14 with a fastener.

As set forth above, the side airbag 16 is inflatable to the inflated position. Specifically, the inflated position may be the position of the side airbag 16 at the end of inflation by the inflator 22, i.e., just before the inflator 22 is exhausted. In an uninflated position, the side airbag 16 is housed in the seatback 12, e.g., behind the covering 32. In such an example, when inflated, the side airbag 16 breaks the covering 32, e.g., at a tear seam, and inflates outwardly from the seatback 12.

The spacer chamber 20 is inflatable to the inflated position adjacent the forward chamber 18. In other words, the spacer chamber 20 and the forward chamber 18 are adjacent in the inflated position, i.e., at least a portion of the spacer chamber 20 is next to at least a portion of the forward chamber 18 with nothing therebetween. The spacer chamber 20 and the forward chamber 18 may abut each other in the inflated position, as shown in FIGS. 1-5.

Figure 4:
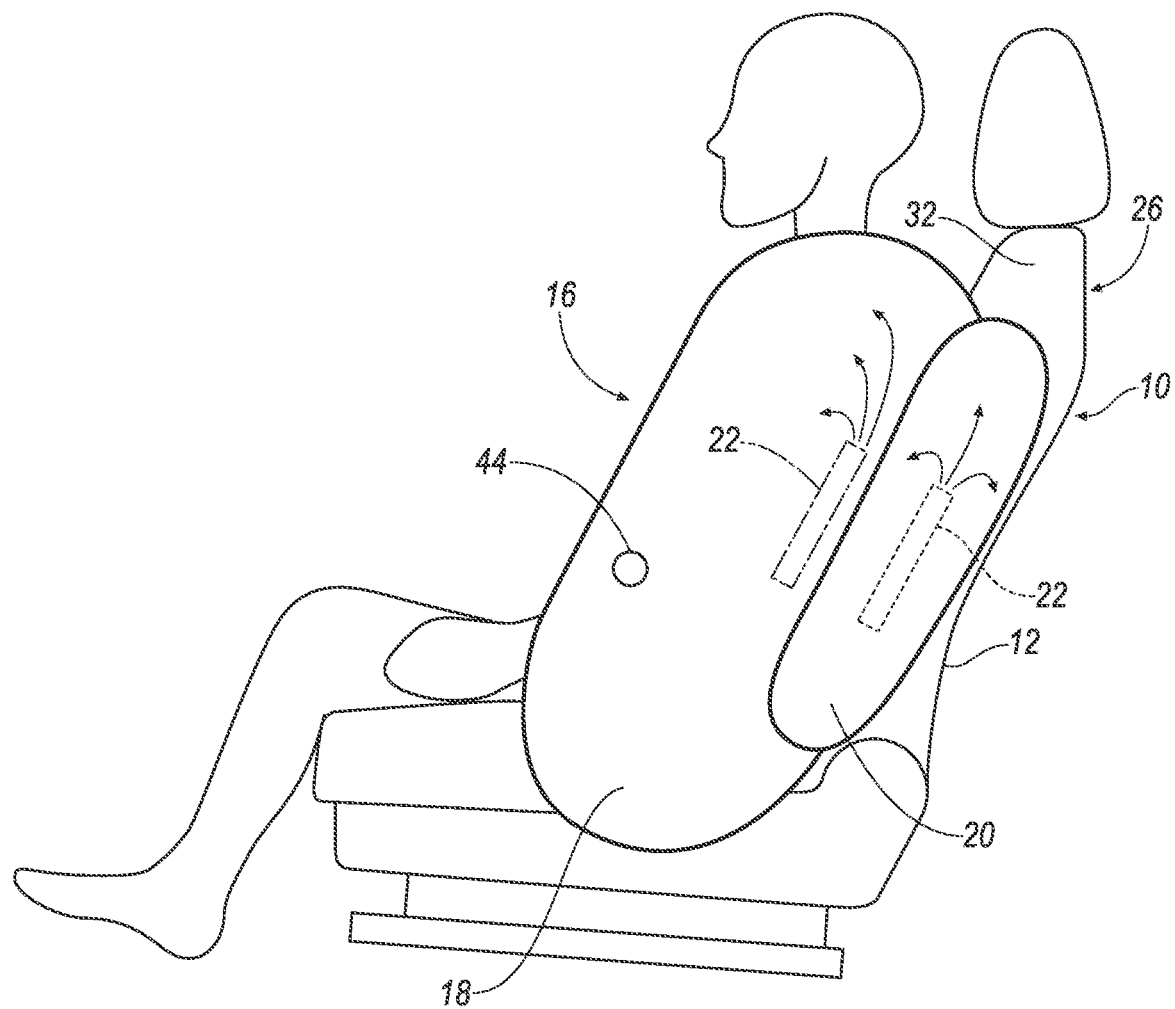
FIG. 4 is a side view of the seat and another example of the side airbag.

The spacer chamber 20 is positioned to be between the seat 26 and the door 28 in the inflated position. In the event of a side impact that urges the door 28 to intrude into the occupant compartment, the spacer chamber 20 fills the gap between the seat 26 and the door 28 to resist door intrusion. The spacer chamber 20 may be elongated along the upright frame member 14, as shown in FIGS. 2-4. In such an example, the elongated shape of the spacer chamber 20 increases the contact area between the door 28 and the spacer chamber 20 to increase the resistance that the spacer chamber 20 provides against door intrusion.

Figure 5:
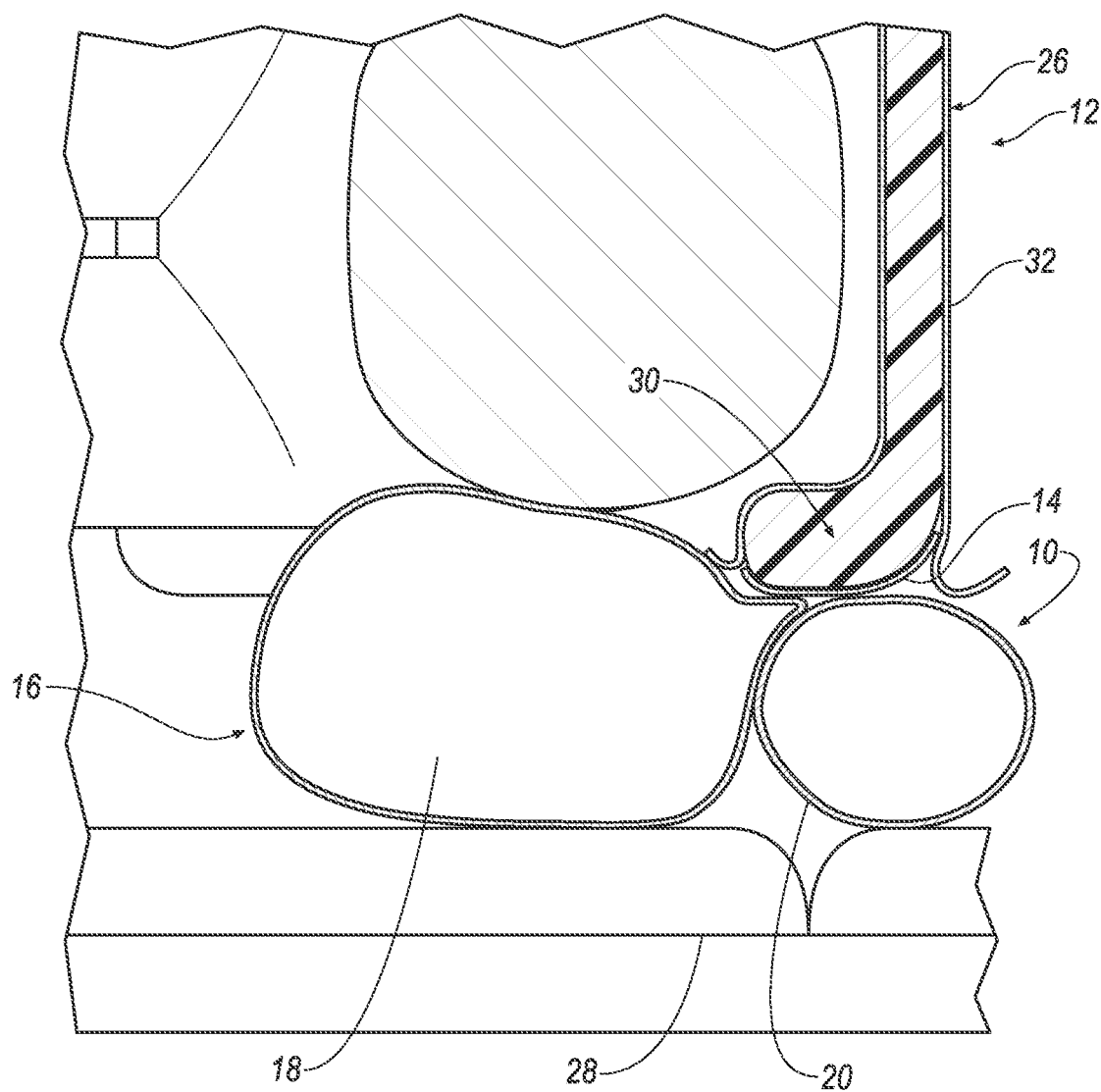
FIG. 5 is a cross sectional view of the side airbag and the seat along line 1 in FIG. 1.
Figure 6:
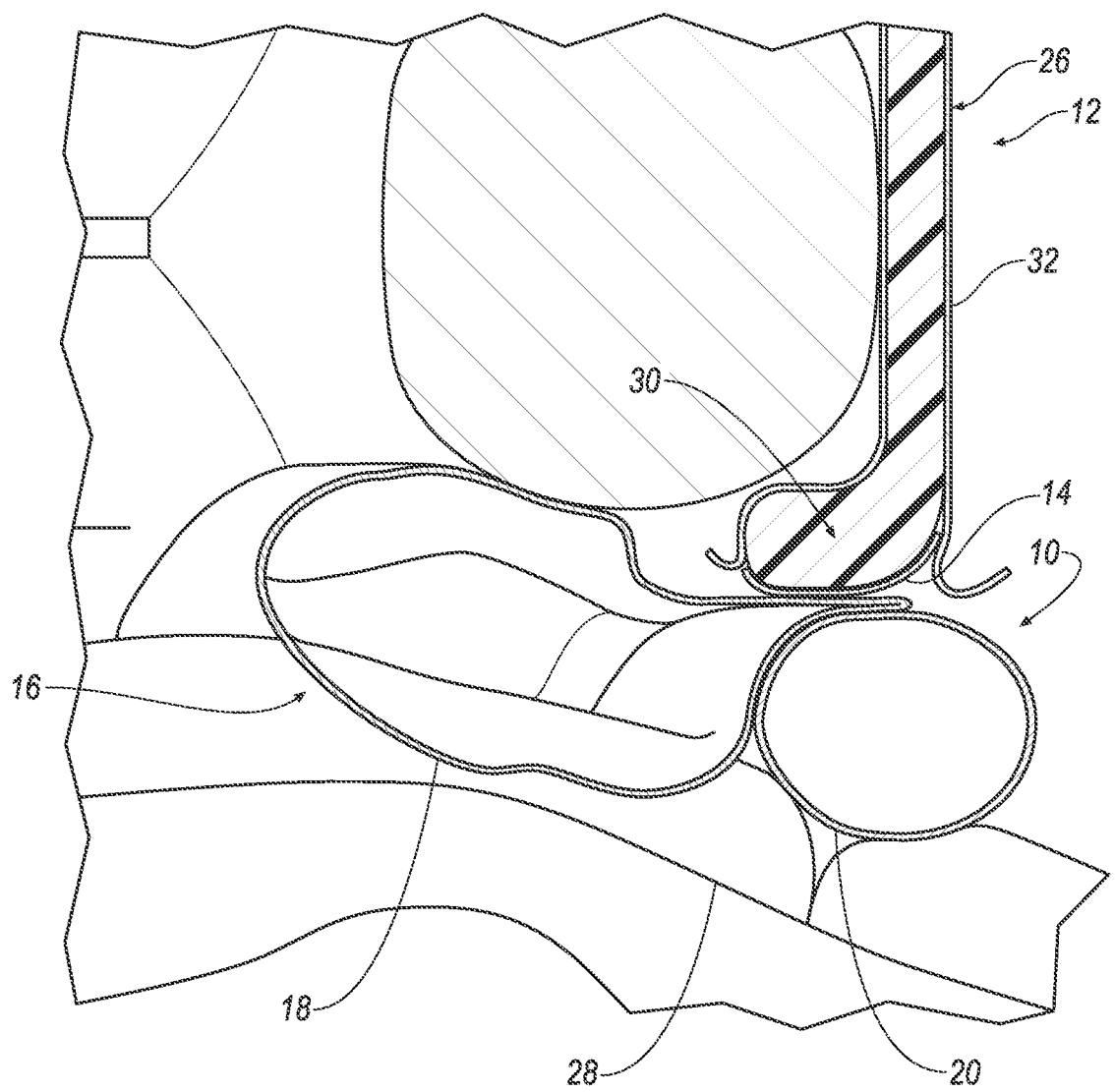
FIG. 6 is a cross-sectional view of the side airbag, the seat, and a door along line 1 in FIG. 1 during a side impact.

The forward chamber 18 extends in a vehicle-forward direction from the spacer chamber 20 in the inflated position. Accordingly, the forward chamber 18 controls the kinematics of the upper body and/or head of the occupant, e.g., during a side impact. As shown in FIGS. 5 and 6, a portion of the forward chamber 18 may extends between the spacer chamber 20 and the seat 26 in the inflated positions. In particular, a portion of the forward chamber 18 and a portion of the spacer chamber 20 abut the upright frame member 14 to be positioned to be in communication with the inflator 22, which may be mounted to the upright frame member 14.

The forward chamber 18 may include a vent 44 in communication with atmosphere. The vent 44 allows for exhaust of gas from the forward chamber 18 to reduce stiffness when impacted by the occupant. The spacer chamber 20 may be unvented, i.e., may be sealed, to retain stiffness, e.g., when impacted by the door 28 to resist intrusion of the door 28.

As set forth above, the spacer chamber 20 and the forward chamber 18 are substantially fluidly separated from each other. Substantially fluidly separated means little or no inflation medium flows from one to another, but the inflation medium can come from the same source, e.g., a common inflator 22. As one example, the spacer chamber 20 and the forward chamber 18 are completely fluidly separated, i.e., there is not flow of inflation medium between the forward chamber 18 and the spacer chamber 20. In another example, due to manufacturing and material capabilities, a minimal amount of inflation medium may flow between the forward chamber 18 and the spacer chamber 20, e.g., through panels, seams etc., but in such an event, the spacer chamber 20 is maintained at a higher pressure that the forward chamber 18 during inflation.

The spacer chamber 20 and the forward chamber 18 may be formed separate, i.e., may be formed as separate bags that are subsequently attached together on a common base. As another example, the chambers 18, 20 could formed from a single bag with a panel separating the chambers 18, 20.

The forward chamber 18 and the spacer chamber 20 are inflatable from an uninflated position, shown in FIG. 1, to an inflated position, shown in FIGS. 2-4. The forward chamber 18 and the spacer chamber 20 may be of the same type of material. The forward chamber 18 and the spacer chamber 20 may be a woven polymer or any other material. As one example, the forward chamber 18 and the spacer chamber 20 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

As set forth above, the spacer chamber 20 may be inflated to a greater pressure than the forward chamber 18 so that the spacer chamber 20 is at a pressure that resists door intrusion and the forward chamber 18 is at a pressure to control occupant kinematics. At least one of the inflator 22 and/or the forward chamber 18 and spacer chamber 20 are designed to inflate the spacer chamber 20 to a higher pressure than the forward chamber 18 in the inflated positions. As one example, with reference to FIG. 2, the first outlet 36 and the second outlet 38 of the diffuser 34 in combination with the volume of the forward chamber 18 and the spacer chamber 20 may be sized to inflate the spacer chamber 20 to a higher pressure than the forward chamber 18. In such an example, the fluid pathway to the spacer chamber 20 may be a different size that the fluid pathway to the forward chamber 18, i.e., may have a different cross-sectional area. In one example, the fluid pathway to the spacer chamber 20 may be larger than the fluid pathway to the forward chamber 18. As another example, the fluid pathway to the spacer chamber 20 may be smaller than the fluid pathway to the forward chamber 18, in which case the spacer chamber 20 is inflated to a greater pressure than the forward chamber 18 due to the relatively smaller volume of the spacer chamber 20.

As another example, with reference to FIG. 3, the design of the gas output at the ends of the inflator 22 in combination with the size of the volume of the forward chamber 18 and the spacer chamber 20 may be designed to inflate the spacer chamber 20 to a higher pressure than the forward chamber 18. As another example, with reference to FIG. 4, the design of the gas output of the separate inflators 22 in combination with the size of the volume of the forward chamber 18 and the spacer chamber 20 may be designed to inflate the spacer chamber 20 to a higher pressure than the forward chamber 18.

The vehicle 24 may include an impact sensor. The impact sensor is programmed to detect an impact to the vehicle 24. The impact sensor may detect a direction of the impact, e.g., a driver side impact, a passenger side impact, etc. The impact sensor may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor may be located at numerous points in or on the vehicle 24.

The vehicle 24 may include a communication network. The communication network includes hardware, such as a communication bus, for facilitating communication among components, e.g., the inflator 22, the computer, the impact sensor, etc. The communication network may facilitate wired or wireless communication among the components in accordance with a number of communication protocols such as controller area network (CAN), Ethernet, WiFi, Local Interconnect Network (LIN), and/or other wired or wireless mechanisms.

The computer may be a microprocessor-based controller implemented via circuits, chips, or other electronic components. For example, the computer may include a processor, memory, etc. The memory of the computer may include memory for storing instructions executable by the processor as well as for electronically storing data and/or databases.

The memory may store instructions executable by the processor to inflate the side airbag 16 based on a detected direction of an impact to the vehicle 24. The computer may detect the direction of the impact based on information from the impact sensor, e.g., received via the communication network. For example, the computer may detect an impact to the side of the vehicle 24 adjacent the side airbag 16. Such impact may be known as a near side impact. In response, the computer may transmit an instruction, e.g., via the communication network, to the inflator 22 to inflate the side airbag 16.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a vehicle door;
   a seatback having an upright frame member;
   a side airbag mounted to the upright frame member and inflatable to an inflated position;
   the side airbag including a forward chamber and a spacer chamber adjacent each other and completely fluidly separated from each other in the inflated position;
   the spacer chamber being elongated along the upright frame member between the door and the upright frame member in a cross-vehicle direction perpendicular to a vehicle-longitudinal axis in the inflated position; and
   at least one inflator in fluid communication with the forward chamber and the spacer chamber;
   the spacer chamber is at a higher pressure than the forward chamber in the inflated position.

2. The assembly as set forth in claim 1, wherein the at least one of the inflator and the forward chamber and the spacer chamber are designed to inflate the spacer chamber to a higher pressure than the forward chamber in the inflated positions.

3. The assembly as set forth in claim 1, wherein the forward chamber extends in a vehicle-forward direction from the spacer chamber in the inflated position.

4. The assembly of claim 1, wherein a portion of the forward chamber extends between the spacer chamber and the seatback in the inflated position.

5. The assembly as set forth in claim 1, wherein the at least one inflator is a single inflator in fluid communication with both the forward chamber and the spacer chamber.

6. The assembly as set forth in claim 5, wherein the inflator includes a diffuser in communication with both the forward chamber and the spacer chamber.

7. The assembly as set forth in claim 6, wherein the diffuser includes a fluid pathway to both the forward chamber and the spacer chamber, the fluid pathway to the spacer chamber being a different size than the fluid pathway to the forward chamber.

8. The assembly as set forth in claim 5, wherein the inflator includes a first gas outlet in communication with the forward chamber and a second gas outlet in communication with the spacer chamber.

9. The assembly as set forth in claim 1, wherein the at least one inflator includes a first inflator in communication with the forward chamber and a second inflator in communication with the spacer chamber.

10. The assembly as set forth in claim 1, wherein the at least one inflator is mounted to the seatback.

11. The assembly as set forth in claim 1, wherein the volume of the spacer chamber is less than the volume of the forward chamber.

12. The assembly as set forth in claim 1, wherein a portion of the forward chamber and a portion of the spacer chamber abut the upright frame member, the forward chamber extending in a vehicle-forward direction from the spacer chamber.

13. The assembly as set forth in claim 1, wherein the volume of the spacer chamber is less than the volume of the forward chamber.

14. The assembly as set forth in claim 1, wherein a portion of the forward chamber and a portion of the spacer chamber abut the upright frame member, the forward chamber extending in a vehicle-forward direction from the spacer chamber.

15. The assembly of claim 14, wherein a portion of the forward chamber extends between the spacer chamber and the seatback in the inflated position.

16. The assembly as set forth in claim 15, wherein the volume of the spacer chamber is less than the volume of the forward chamber.

* * * * *